March 9, 1965  R. J. BLAZEK  3,172,773
METHOD OF MAKING A LIGHT-TRANSMITTING, ELECTRICALLY
CONDUCTING ELEMENT
Filed Oct. 28, 1960

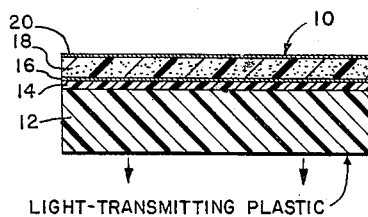

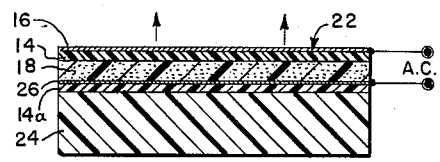

LIGHT-TRANSMITTING PLASTIC

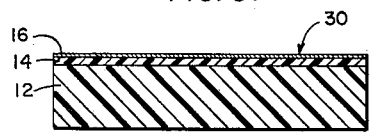

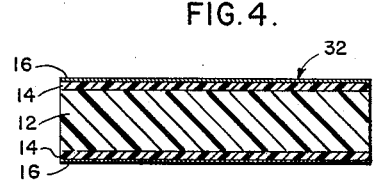

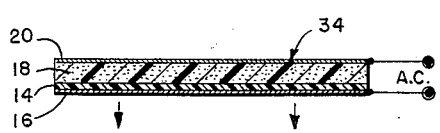

```
┌─────────────────────────┐
│   PLACE THIN LAYER OF   │
│  POLYMERIZABLE SUBSTANCE│
│   ON PLASTIC SUBSTRATE. │
└─────────────────────────┘
             │
             ▼
┌─────────────────────────┐
│  DEPOSIT FILM OF CONDUCTING │
│   MATERIAL ONTO THIN LAYER  │
│  OF POLYMERIZABLE SUBSTANCE.│
└─────────────────────────┘
             │
             ▼
┌─────────────────────────┐
│   POLYMERIZE THIN LAYER │
│  OF POLYMERIZABLE SUBSTANCE.│
└─────────────────────────┘
```

FIG. 7.

INVENTOR.
ROBERT J. BLAZEK.
BY
W. D. Palmer
ATTORNEY.

United States Patent Office 3,172,773
Patented Mar. 9, 1965

3,172,773
METHOD OF MAKING A LIGHT-TRANSMITTING, ELECTRICALLY CONDUCTING ELEMENT
Robert J. Blazek, Mendham, N.J., assignor to Westinghouse Electric Corporation, East Pittsburgh, Pa., a corporation of Pennsylvania
Filed Oct. 28, 1960, Ser. No. 65,690
3 Claims. (Cl. 117—33.5)

This invention relates to electroluminescence and, more particularly, to a very thin electroluminescent device, a method for affixing a conducting coating to a supporting plastic foundation, and an electrically conducting element.

The phenomenon of electroluminescence was first disclosed by G. Destriau, one of his earlier publications appearing in London, Edinburgh and Dublin Philosophical Magazine, Series 7, volume 38, No. 285, pages 700–737 (October 1947). Since this early publication, electroluminescent devices have been marketed commercially. For best impact and shock resistance, it is desirable to eliminate all glass and ceramic in an electroluminescent device. It is also desirable to be able to frabricate all-plastic electroluminescent devices which can be readily conformed to predetermined configuration.

In fabricating all-plastic electroluminescent devices, one of the problems presented is making at least one of the spaced electrodes of light-transmitting material. Where a layer of glass or ceramic is used as a part of an electroluminescent device, it is a relatively easy matter to form a light-transmitting, tin-oxide electrode directly on the glass or ceramic layer. The temperatures required to form a tin oxide electrode are relatively high, however, thereby precluding the use of such electrode material with an all-plastic electroluminescent device. To overcome this difficulty, light-transmitting electrodes have been formed of metal mesh or tin-oxide-coated glass fibers. For best performance, however, it is preferable to utilize a continuous film of light-transmitting, electrically conducting material. In this regard, continuous vapor-deposited gold films have been formed directly on plastic. The main drawback to such gold electrode films is their poor adherence to plastic. This has resulted in both manufacturing difficulties and service failures.

It is very desirable for some applications to make electroluminescent devices as thin as possible. In the usual electroluminescent construction, the thickness of the device is determined primarily by the foundation or substrate on which the operative spaced electrodes and phosphor-dielectric layer are supported. To date it has been difficult to eliminate the relatively thick substrate due to the troubles encountered in forming and supporting a transparent electrode film directly on the electroluminescent phosphor-dielectric layer.

It is the general object of this invention to avoid and overcome the foregoing and other difficulties of and objections to prior-art practices by the provision of a method for affixing a solid, electrically conducting electrode film to a solid plastic substrate.

It is another object to provide a light-transmitting, electrically conducting element.

It is a further object to provide a very thin electroluminescent device which does not utilize a substrate or foundtion to support the operative portions of the electroluminescent device.

For a better understanding of the invention, reference should be had to the accompanying drawings wherein:

FIG. 1 is a sectional elevational view of an electroluminescent device constructed in accordance with the present invention and wherein a light-transmitting electrode film is bonded firmly to the light-transmitting substrate;

FIG. 2 is a sectional elevational view of an electroluminescent device wherein a light-transmitting electrode film is bonded firmly to the exposed or unsupported surface of the phosphor-dielectric layer of the device;

FIG. 3 is a sectional elevational view of a light-transmitting, electrically conducting element which can be used in fabricating the device embodiment as shown in FIG. 1;

FIG. 4 is a sectional elevational view of an alternative light-transmitting, electrically conducting element wherein both faces of the element are light-transmitting and electrically conducting;

FIG. 5 is a sectional elevational view of a very thin electroluminescent device which does not utilize a substrate or foundation;

FIG. 6 is a sectional elevational view of a very thin electroluminescent device which does not utilize any foundation and which is adapted to emit light from both sides;

FIG. 7 is a flow chart illustrating the basic steps of the present method, as used in forming the element shown in FIG. 3.

Although the principles of the present invention are applicable to any type of electroluminescent device, or any device wherein an electric field is to be applied across a predetermined area, the invention has particular utility with respect to the electroluminescent devices which are intended to serve as light sources and hence it has been so illustrated and will be so described.

With specific reference to the form of the invention illustrated in the drawings, the numeral 10 in FIG. 1 indicates generally an electroluminescent device comprising a light-transmitting plastic foundation 12 which carries thereon the operative portions of the device. Overlaying the plastic foundation 12 and bonded thereto is a light-transmitting polymer layer 14 and a light-transmitting, electrically conductive electrode film 16 is positioned to overlay the polymer layer 14 and is bonded thereto. A phosphor-dielectric layer 18 is carried over the electrode film 16 and a second electrode 20 is carried over the phosphor-dielectric layer 18.

As an example, the light-transmitting plastic foundation is formed of polymonochlorotrifluoroethylene and other suitable plastic materials such as polyethylene, polypropylene, polystyrene, acrylates or vinyls can be substituted therefor. The polymer layer 14 is formed of epoxy resin or other light-transmitting polymer such as polyurethane resin or alkyd resin. The purpose of the layer 14 is to bond the electrode film 16 to the plastic foundation 12 and a thin layer of any of the foregoing resins will serve this purpose. As an example, the thickness of the layer 14 is one-half mil; this thickness is not critical and is subject to considerable variation. The electrode film 16 is formed of vacuum-deposited gold which is sufficiently thin to be light transmitting. The gold film is preferably modified by the addition of specific metallic oxides, as described in copending application Ser. No. 65,689, filed concurrently herewith and now Patent No. 3,074,816, titled "Light-Transmitting, Electrically Conducting Element," by Robert J. Blazek, and owned by the present assignee. The electrode film 16 can also be formed of thin, light-transmitting, vacuum-deposited films of silver, platinum or palladium. The phosphor-dielectric layer 18 is formed of a light-transmitting, plastic dielectric material such as polyvinyl chloride, polyvinyl-chloride acetate, or copolymers thereof, having finely divided phosphor embedded throughout. The phosphor can comprise any electroluminescent phosphor and copper-activated zinc sulfide has been found to be very satisfactory. The state of division of the phosphor is not critical and as an example, it has an average particle diameter of about 12 microns. The ratio by weight of phosphor to dielectric can vary over a wide range and as an example, equal parts by weight of phosphor and dielectric are mixed to form the layer 18. The second electrode 20 is formed of vacuum-metallized, opaque aluminum and this electrode 20 can be formed of other materials, such as silver. An alternating electric potential is adapted to be applied across the electrodes 14 and 20 in order to energize the device to light emission.

The device embodiment 22, as shown in FIG. 2, is modified from that embodiment as shown in FIG. 1 in that the foundation 24 is formed of opaque plastic material such as urea formaldehyde and a vacuum-metallized electrode layer 26, such as opaque silver or aluminum, is affixed to the foundation 24 by means of an intermediate polymer layer 14a. The phosphor-dielectric layer 18 is similar to the corresponding layer as shown in FIG. 1, and the vacuum-deposited gold or similar electrode film 16, as described hereinbefore, is bonded to the upper portion of the phosphor-dielectric layer 18 by means of the light-transmitting polymer layer 14. With such a construction, the light is emitted from the uppermost face of the device 22 and the adherence of the opaque electrode layer 26 to the foundation 24 is improved because of the intermediate bonding polymer layer 14a.

In FIG. 3 is shown a light-transmitting, electrically conducting element 30 which constitutes the foundation and first electrode for the device embodiment 10 as shown in FIG. 1. In fabricating this element 30, as shown in the flow diagram of FIG. 7, there is first placed over the plastic substrate 12 a thin layer of non-gaseous, polymerizable substance which is at most partly polymerized. This substance is so selected that when polymerized to form the layer 14, it will bond securely to the plastic substrate 12. Any of the foregoing polymer layer examples will bond securely to any of the foregoing plastic substrate examples. As a specific example, a one-half-mil-thick layer of partially polymerized, tacky polyurethane resin is placed on a polymonochlorotrifluoroethylene substrate. A very thin electrically conducting and light-transmitting film of gold, or other substance as described hereinbefore, is then vacuum-deposited onto the partially polymerized polyurethane resin. Thereafter, the polyurethane resin is completely polymerized by exposing it to a temperature of 120° C. for a period of twenty minutes. When the resin is completely polymerized, it will bond securely to the foundation 12 and also to the electrode film 16, apparently because of the molecular reorientation which takes place in the layer 14 during polymerization. If the electrode film 16 were to be vacuum-deposited directly onto the plastic foundation 12, the adherence of this film 16 to the plastic foundation 12 would be quite poor.

If the conducting electrode film is to be vacuum deposited, as specified hereinbefore, the intermediate layer of polymerizable material should also have a low volatility so as not to evaporate readily when exposed to vacuum under room-temperature conditions. All of the foregoing examples of polymerizable material meet this requirement.

The actual degree of polymerization of the intermediate layer, when initially placed over the plastic substrate, is immaterial, provided this intermediate layer is at most only partly polymerized. In the foregoing example, the polyurethane resin is partially polymerized so as to present a slightly tacky surface. In the case an epoxy resin is used as the intermediate layer, the resin can be completely uncured and placed onto the plastic substrate as a very viscous fluid. It is immaterial how the polymerization of this intermediate layer is effected. In the case of polyurethane resin, heating is preferred. In the case of other polymerizable materials, such as epoxy resins, polymerization is normally effected with a suitable catalyst, either with or without the application of additional heat, and such catalysts are well known. The same applies to other partially polymerized or so-called uncured resins which may be used as the intermediate layer, such as alkyd or polyester resins.

In FIG. 4 is shown an alternative light-transmitting electrically conductive element 32 wherein both sides or faces are made electrically conducting by bonding electrode films 16 onto both faces of the foundation 12 by means of the intermediate polymer layers 14. Such an element construction is useful in fabricating composite electroluminescent devices which are formed of plural electrode and phosphor-dielectric layers.

In FIG. 5 is shown a very thin electroluminescent device embodiment 34, which device essentially comprises a phosphor-dielectric layer 18, such as shown in FIGS. 1 and 2 and described hereinbefore, with a light-transmitting electrode film 16 affixed to one side of the layer 18 by means of the intermediate polymer layer 14. The other electrode 20 is formed of vacuum-metallized material, such as aluminum or silver. The thickness of the electroluminescent device 34 is determined primarily by the phosphor-dielectric layer 18 so that the device need have a total thickness only slightly greater than the thickness of the phosphor-dielectric. An alternating electric potential is adapted to be applied across the electrodes 16 and 20 in order to energize the device to light emission. Such a construction was previously difficult to fabricate because of the difficulty of adhering the electrode film 16 to the phosphor-plastic dielectric layer 18.

The device embodiment 36, as shown in FIG. 6, is generally similar to the embodiment 34, as shown in FIG. 5, except that both faces of the device 36 serve to emit the generated light. Essentially the embodiment 36 comprises a phosphor dielectric layer 18 having electrode films 16 bonded to both faces thereof by means of separate polymer layers 14, such as described hereinbefore.

It should be understood that any of the electroluminescent devices, as illustrated and described hereinbefore, can be insulated from the atmosphere and protected with respect to shock hazard by an encasing layer of insulating material, such as an insulating layer of light-transmitting epoxy resin.

It will be recognized that the objects of the invention have been achieved by providing a method for affixing a solid, electrically conducting electrode film to a solid plastic substrate. There have also been provided a light-transmitting, electrically conducting element which can be used in fabricating an electroluminescent device as well as an electroluminescent device which does not utilize a substrate or foundation to support the operative portions of the device.

While best embodiments of the invention have been illustrated and described hereinbefore, it is to be particularly understood that the invention is not limited thereto or thereby.

I claim:

1. The method of affixing a solid light-transmitting electrically conducting film to a light-transmitting solid plastic substrate by means of an intermediate polymer layer, which method comprises: placing as a thin layer over said plastic substrate, a non-gaseous polymerizable substance which is at most only partly polymerized, will not volatilize readily when exposed to vacuum at normal-room temperature, and which when polymerized is light-transmitting and will bond securely to said plastic substrate; vacuum depositing onto said polymerizable substance layer, a film of light-transmitting electrically conducting material; and polymerizing said polymerizable substance layer.

2. The method of affixing by means of a polymer layer, a solid light-transmitting electrically conducting film to a layer comprising finely divided inorganic electroluminescent phosphor embedded in solid light-transmitting plastic, which method comprises: placing as a thin layer over said phosphor-plastic layer, a non-gaseous polymerizable substance which is at most only partly polymerized, will not volatilize readily when exposed to vacuum at normal-room temperature, and which when polymerized is light transmitting and will bond securely to said plastic substrate; vacuum depositing onto said polymerizable substance layer, a light-transmitting electrically conducting metallic film; and polymerizing said polymerizable substance layer.

3. The method of affixing a solid light-transmitting electrically conducting film to a light transmitting polymonochlorotrifluoroethylene plastic substrate by means of an intermediate polymer layer, which method comprises: placing as a thin layer over said plastic substrate, a partially polymerized layer of polyurethane; vacuum-depositing onto said polyurethane layer, a metallic light-transmitting electrically conducting film; and polymerizing said partially polymerized polyurethane layer.

References Cited by the Examiner

UNITED STATES PATENTS

| | | | |
|---|---|---|---|
| 2,597,396 | 5/52 | Squires | 156—233 |
| 2,872,341 | 3/59 | Stein | 117—107 |
| 2,891,876 | 6/59 | Brown et al. | 117—138.8 |
| 2,941,104 | 6/60 | Swindells | 313—108.1 |
| 2,976,446 | 3/61 | Meloon et al. | 313—108.1 |
| 2,984,597 | 5/61 | Hennes | 156—233 |
| 2,992,939 | 7/61 | Larson et al. | 117—75 |
| 3,042,545 | 7/63 | Kienle et al. | 117—75 |

RICHARD D. NEVIUS, *Primary Examiner.*

RALPH G. NILSON, *Examiner.*